United States Patent [19]

Kobayashi

[11] Patent Number: 5,314,722
[45] Date of Patent: May 24, 1994

[54] METHOD OF APPLYING A MATERIAL TO A ROTATING OBJECT BY USING A ROBOT

[75] Inventor: Hirohiko Kobayashi, Minamitsuru, Japan

[73] Assignee: Fanuc Ltd, Minamitsuru, Japan

[21] Appl. No.: 13,666

[22] Filed: Jan. 28, 1993

Related U.S. Application Data

[63] Continuation of Ser. No. 646,724, Jan. 29, 1991, abandoned.

[30] Foreign Application Priority Data

Jun. 29, 1989 [JP] Japan ................ 1-165325

[51] Int. Cl.⁵ ............................................ B05D 1/02
[52] U.S. Cl. .................................. 427/425; 427/421;
  427/424; 118/695; 118/696; 118/321; 901/14
[58] Field of Search ............... 427/421, 424, 425;
  118/695, 696, 416, 321, 668, 697; 901/14

[56] References Cited

U.S. PATENT DOCUMENTS

| | | | |
|---|---|---|---|
| 3,019,014 | 1/1962 | Miksis | 427/425 |
| 3,915,114 | 10/1975 | Pelton | 118/668 |
| 4,048,951 | 9/1977 | Tamura | 118/668 |
| 4,821,673 | 4/1989 | Kirigaakubo et al. | 901/43 X |
| 5,079,043 | 1/1992 | Lambert | 427/425 |
| 5,114,736 | 5/1992 | Griffiths et al. | 427/425 |
| 5,114,752 | 5/1992 | Hall | 427/421 |
| 5,141,165 | 8/1992 | Sharpless et al. | 901/43 |

FOREIGN PATENT DOCUMENTS

| | | |
|---|---|---|
| 61-141952 | 6/1986 | Japan. |
| 62-264883 | 11/1987 | Japan. |
| 63-44961 | 2/1988 | Japan. |
| 63-197567 | 8/1988 | Japan. |

OTHER PUBLICATIONS

English Equivalent Abstracts of Japanese Patents 63-44961 and 61-141952.

*Primary Examiner*—Shrive Beck
*Assistant Examiner*—David M. Maiorana
*Attorney, Agent, or Firm*—Staas & Halsey

[57] ABSTRACT

Material is uniformly applied to the entire outer peripheral surface of a rotating object by using a robot. The material is discharged toward the rotating object from a nozzle (2) of a material discharging device mounted on the distal end of a robot arm, with the nozzle moved along the outer peripheral surface of the object, e.g., a truncated cone (1), rotating at a predetermined speed. A robot control device periodically calculates coordinates (x, R, 0) in a work coordinate system (P5-XwYwZw), including a target moving position (x) of the nozzle in the direction of the rotation axis and a corresponding target nozzle moving position (R) in the radial direction which are individually expressed as a function of the time elapsed after the start of the material applying process (S12). These coordinates are converted to a robot-base coordinate system (OB-XBYBZB) (S14) and converts the result to data for respective robot axes (S15). Then, a pulse distribution is executed in accordance with moving amounts for the respective robot axes in the present cycle which are calculated based on the above data and data obtained in the preceding cycle (S16–S18). As a result, the nozzle mounted on the robot arm is moved at a speed corresponding to the outer diameter of the rotating object which varies along its rotation axis, to uniformly apply the material to the entire outer peripheral surface of the rotating object to the target thickness.

2 Claims, 5 Drawing Sheets

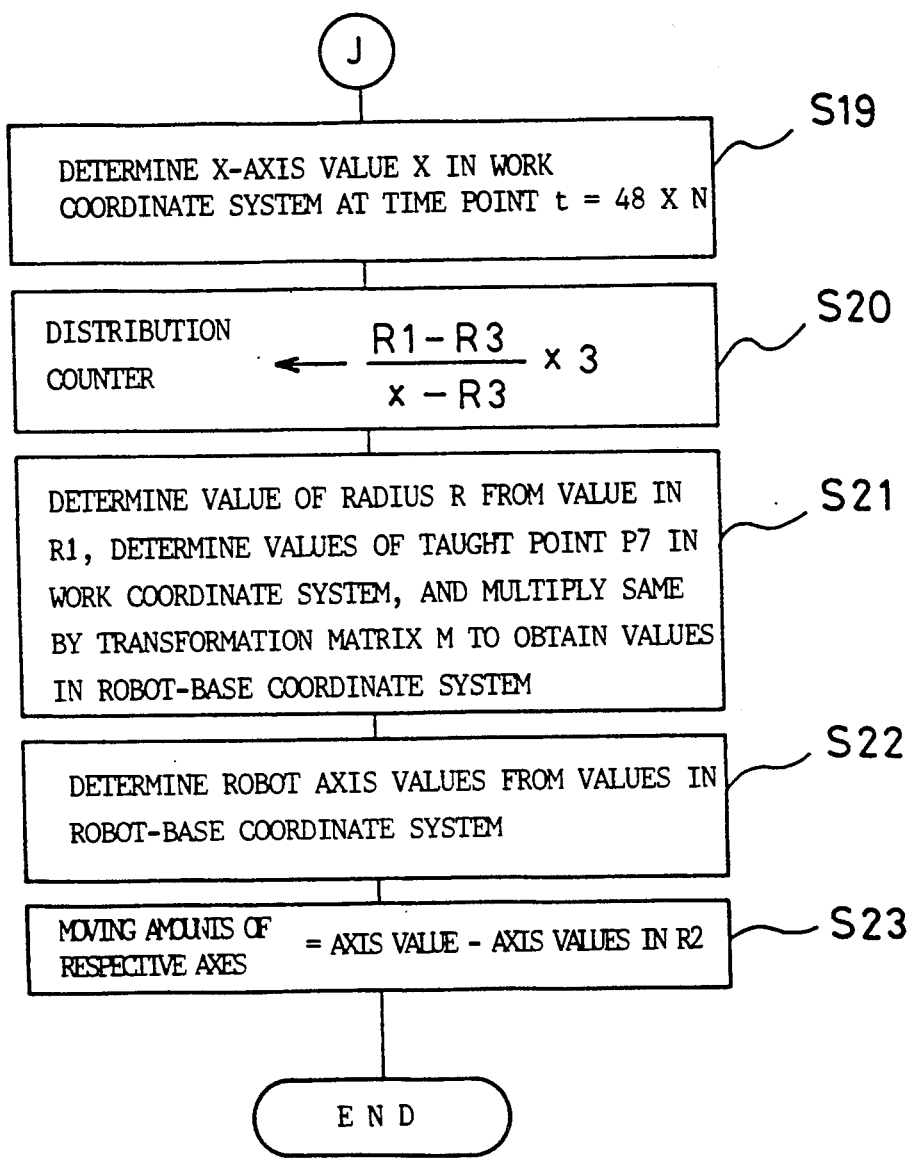

METHOD OF APPLYING A MATERIAL TO A ROTATING OBJECT BY USING A ROBOT

This application is a continuation of application Ser. No. 07/646,724, filed Jan. 29, 1991, now abandoned.

BACKGROUND OF THE INVENTION

1. Field of the Invention

The present invention relates to a method of applying a material, and more particularly, to a method of uniformly applying a material, by using a robot, to the entire outer peripheral surface of a rotating object which has an outer diameter varying along its rotation axis.

2. Description of the Related Art

Conventionally, to apply a material such as paint to a surface of an object, the material is discharged (sprayed or ejected) from a material discharging device toward the object, while the device is moved relative to the object which is fixed, or while the object is rotated and at the same time the material discharging device is fixed or is moved relative to the object. The thickness of the material attached to the object can be made uniform, by moving the object and the material discharging device relative to each other at a constant speed if the surface of the object is a two-dimensional plane, or by rotating the object at a constant speed and at the same time moving the material discharging device along the rotation axis of the object if the object is cylindrical in shape. It is, however, difficult to uniformly apply a material to a rotating object whose outer diameter varies along the rotation axis thereof.

SUMMARY OF THE INVENTION

An object of the present invention is to provide a method of uniformly applying a material, by using a robot, to the entire outer peripheral surface of a variety of rotating objects including a rotating object whose outer diameter varies along its rotation axis.

To achieve the above object, according to the present invention, there is provided a method of applying a material to a rotating object by using a robot, comprising the steps of: (a) setting a predetermined flow rate of the material, a target thickness to which the material is to be attached, and a predetermined relationship formula expressing an outer diameter of the rotating object as a function of its position in a direction of a rotation axis thereof, in a robot control device; (b) rotating the rotating object about its rotation axis at a predetermined speed; (c) discharging the material from a material discharging device having a nozzle mounted to a distal end of an arm of a robot body, toward the rotating object at the predetermined flow rate; (d) calculating, by the robot control device, target traveling speeds of the nozzle in the direction of the rotation axis and in a radial direction of the rotating object which speeds are individually expressed as a function of a position of the nozzle in the direction of the rotation axis and which enable the material to be attached to the rotating object to the target thickness, on the basis of the predetermined flow rate, the target thickness, and the predetermined relationship formula; and (e) driving the robot body under the control of the robot control device such that the nozzle is moved at the calculated target traveling speeds in the direction of the rotation axis and in the radial direction of the rotating object.

As described above, according to the method of the present invention, while the material is discharged at the predetermined flow rate from the material discharging device having a nozzle mounted to the distal end of an arm of the robot body toward a rotating body rotated about the rotation axis thereof at the predetermined speed, the robot body is driven under the control of the robot control device, such that the nozzle is moved at target speeds in the direction of the rotation axis and in the radial direction of the rotating object which speeds are calculated based on the predetermined flow rate, the target thickness, and the predetermined relationship formula expressing the outer diameter of the rotating object as a function of its position in the direction of the rotation axis thereof, and which are individually expressed as a function of the nozzle position in the direction of the rotation axis of the rotating object. Accordingly, the material can be uniformly applied to the entire outer peripheral surface of a variety of rotating objects including a rotating object whose outer diameter varies along the rotation axis thereof.

BRIEF DESCRIPTION OF THE DRAWINGS

FIG. 5 is a flowchart showing the remaining part of the material applying process.

DESCRIPTION OF THE PREFERRED EMBODIMENT

Figure 1:
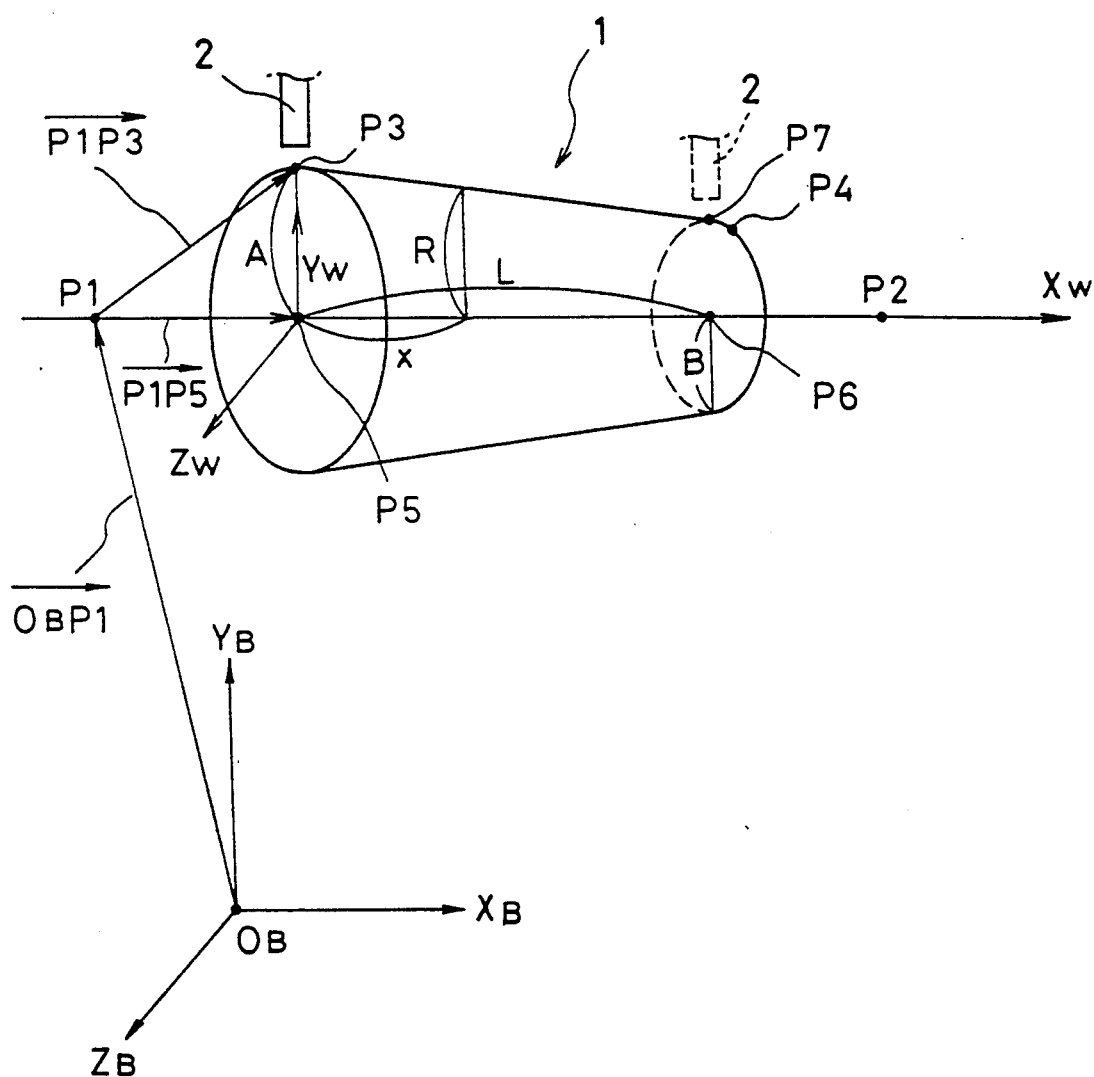
FIG. 1 is schematic perspective view showing a material applying method according to one embodiment of the present invention.

With reference to FIG. 1, a material applying method according to one embodiment of the present invention will be described.

In FIG. 1, reference numeral 1 denotes a truncated cone to which a material is to be applied, and symbols A, B, and L respectively denote the radius of a first end face, the radius of a second end face, and the length of the truncated cone 1. A work coordinate system XwYwZw is set, for example, such that the origin thereof coincides with the center P5 of the first end face of the truncated cone 1 and the Xw axis thereof coincides with the rotation axis of the truncated cone 1. The Yw axis of the work coordinate system extends in the radial direction of the truncated cone 1, and the Zw axis intersects the Xw axis and the Yw axis at right angles thereto. The radius R of the truncated cone 1 at a position x on the Xw axis is expressed by the following equation (1).

$$R = f(x) = A + (B-A) \cdot x/L \quad (1)$$

During the application of a material to the truncated cone 1 by discharging the material from a material discharging device toward the truncated cone 1, a nozzle 2 of the material dischargin device is moved from a point P3 to a point P4 along the Xw axis while the Zw axis position of the nozzle 2 is maintained at "0". An infinitesimal area S of the outer peripheral surface of the truncated cone 1 corresponding to an infinitesimal positional area ranging from an Xw-axis position x to a position (x+Δx) is expressed by the following equation (2).

$$S = 2\pi \cdot f(x) \cdot \Delta x \qquad (2)$$
$$= 2\pi \left\{ A + \frac{B-A}{L} \cdot \left( x + \frac{\Delta x}{2} \right) \right\} \Delta x$$

Assuming that the flow rate of the material supplied through the nozzle 2 is $\underline{K}$, in order to apply the material to the entire infinitesimal area $\underline{S}$ to a thickness $\underline{D}$, the material need be discharged for a period of time $\underline{T}$, given by equation (3), while the nozzle 2 is moved over the infinitesimal distance from the Xw-axis position $\underline{x}$ to the position (x+Δx).

$$T = S \cdot D/K \qquad (3)$$

The traveling speed $\underline{V}$ of the nozzle 2 in the Xw-axis direction at this time can be expressed by the following equation (4).

$$V = \lim_{\Delta x \to 0} \frac{\Delta x}{T} = \frac{dx}{dt} = \frac{\alpha}{(B-A)x + B} \qquad (4)$$

where $\alpha = K \cdot L/2\pi D$ and $\beta = A \cdot L$.

By effecting variable separation, we obtain $$\{(B-A)x + \beta\} \cdot dx = \alpha \cdot dt. \qquad (5)$$

Then, by integrating both sides of this equation, we obtain $$\frac{B-A}{2} x^2 + \beta x = \alpha t + C. \qquad (6)$$

When t=0 (at the start of the material applying process), x=0, and therefore C=0. Then, we obtain $$\frac{B-A}{2} x^2 + \beta x = \alpha t. \qquad (7)$$

Equation (7) is solved to derive $\underline{x}$.

$$x = \frac{-\beta \pm \{\beta^2 + 2\alpha(B-A)t\}^{\frac{1}{2}}}{B-A} \qquad (8)$$

Since x=0 when t=0, we obtain $$x = \frac{-\beta + \{\beta^2 + 2\alpha(B-A)t\}^{\frac{1}{2}}}{B-A} \qquad (9)$$

Thus, the material can be uniformly applied to the entire outer peripheral surface of the truncated cone 1 to the thickness $\underline{D}$, by controlling the traveling speed of the nozzle 2 in the direction of the rotation axis (Xw axis) and the traveling speed thereof in the radial (Yw axis) direction such that the nozzle 2 assumes its Xw-axis position x in the work coordinate system, indicated by equation (9), and at the same time assumes its Yw axis position $\underline{R}$ (actually, its Yw axis position larger than the position $\underline{R}$ by a predetermined clearance), derived by substituting the position $\underline{x}$ in equation (1), when the time period $\underline{t}$ has elapsed from the start point of the material applying process.

Next, with reference to FIG. 2, a material applying apparatus for embodying the method of FIG. 1 will be described.

The material applying apparatus comprises a robot control device 10, a robot body 30 adapted to be controlled by the control device 10, a material discharging device 40 for discharging (spraying or ejecting) a material, such as paint, toward a rotating object, e.g., the truncated cone 1 (FIG. 1), and a drive unit 50 for rotating the truncated cone 1 about the rotation axis thereof. The nozzle 2 (FIG. 1) of the material discharging device 40 is mounted to the distal end of an arm of the robot body 30.

The robot control device 10 comprises a processor (CPU) 11 for executing a control program, a read-only memory (ROM) 12 storing the control program, a random-access memory (RAM) 13 for temporarily storing various data and the results of various calculations executed by the CPU 11, and a nonvolatile memory 14 consisting of a bubble memory or a CMOS memory backed up by a battery. The robot control device 11 further comprises a control panel 15 for to teaching to the robot and inputting various setting values and various commands, and a disk controller 16 adapted to accept a floppy disk storing a teaching program, so as to cause the nonvolatile memory 14 to store a teaching program taught to the robot through an operation of the operator panel 15, etc. or transferred from the floppy disk under the control of the controller 16. Further, the robot control device 11 includes an axis controller 17, a servo circuit 18 for controlling the drive of servomotors for individual axes of the robot body 30 in accordance with control outputs from the axis controller 17, and an interface 19 connected to the material discharging device 40. These elements 12 to 17 and 19 are connected to the CPU 11 through busses 20.

Figure 2:
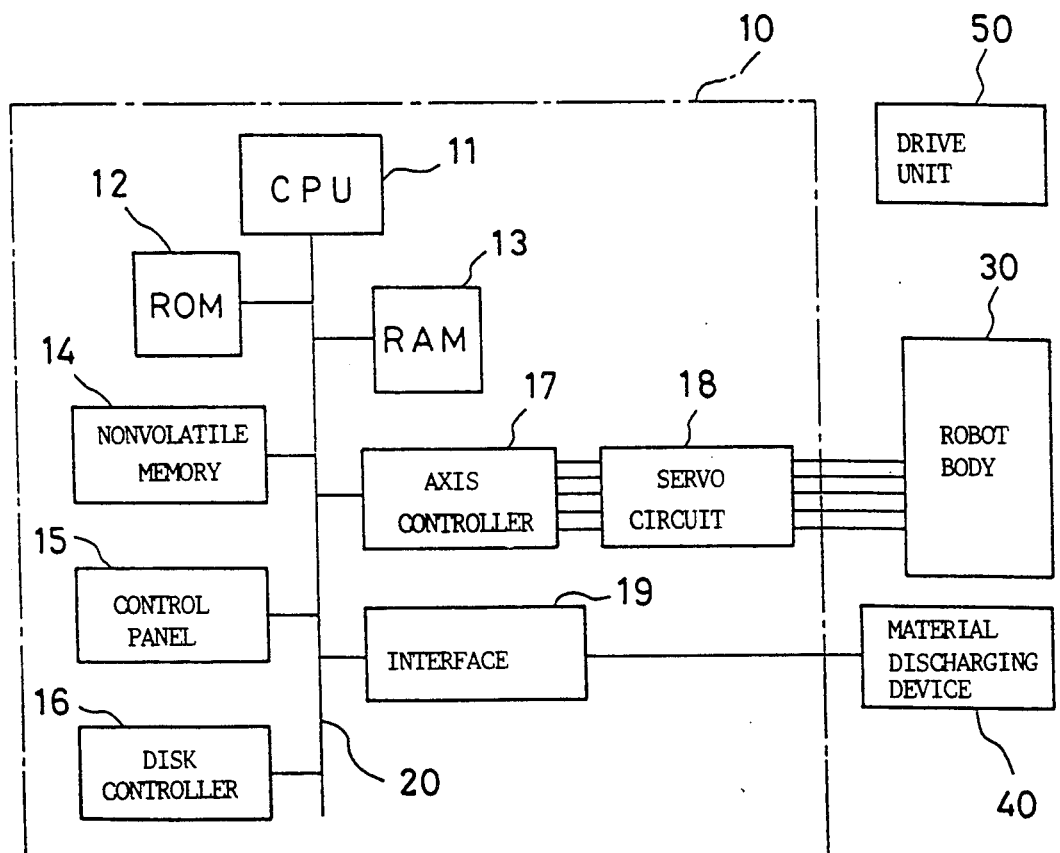
FIG. 2 is a schematic block diagram showing a device for embodying the method shown in FIG. 1.
Figure 3:
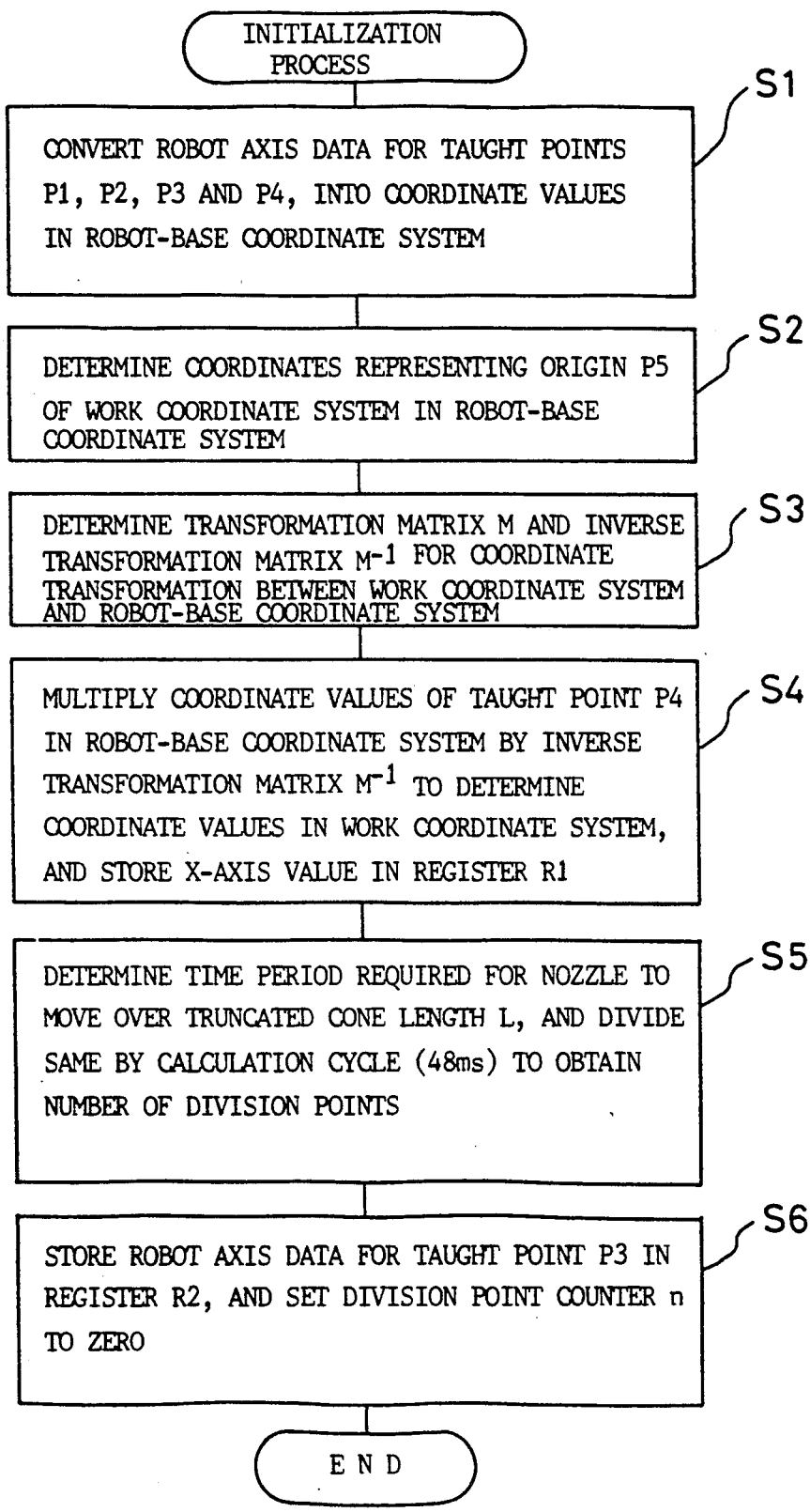
FIG. 3 is a flowchart showing an initialization process executed by the device shown in FIG. 2.
Figure 4:
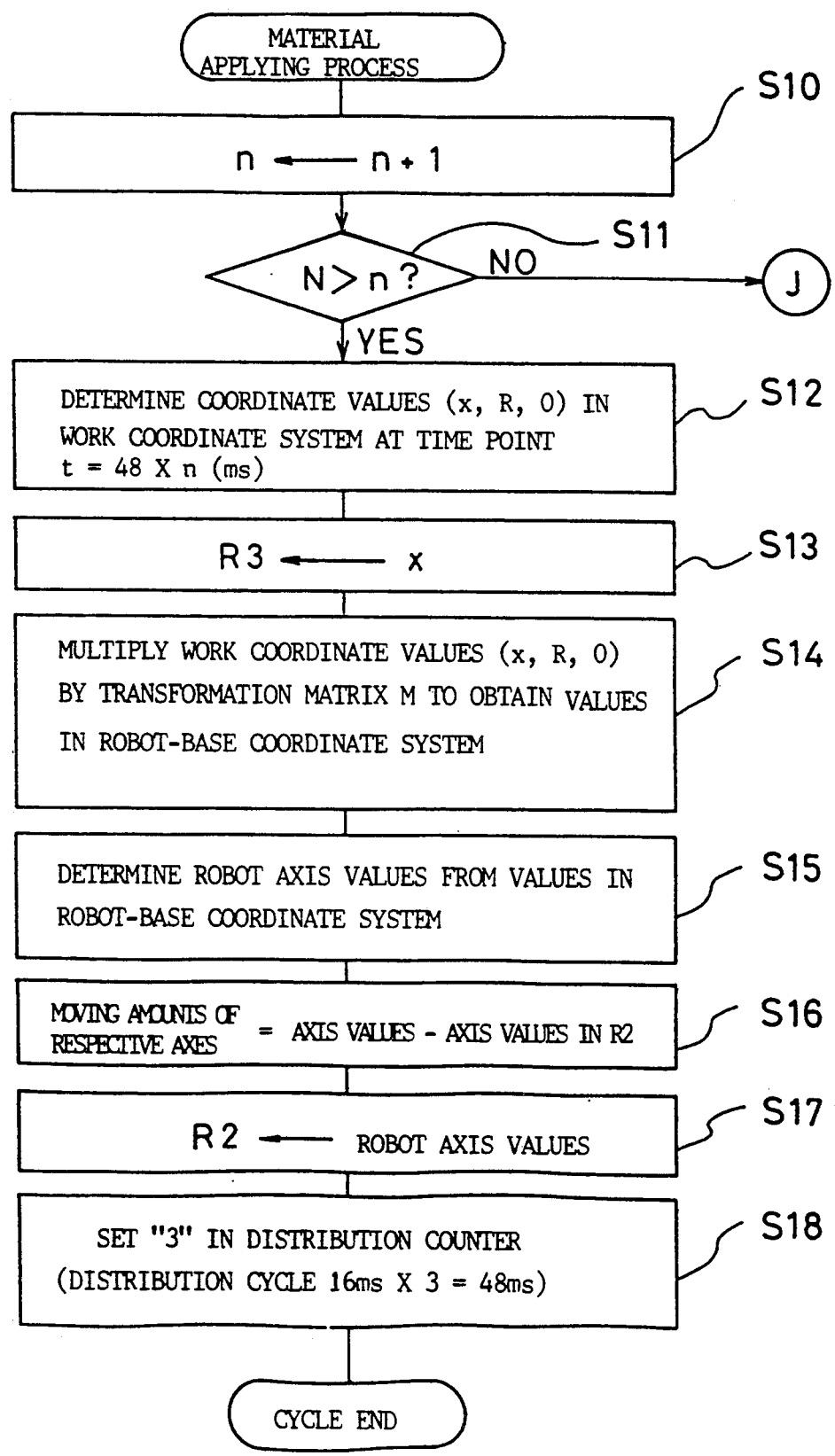
FIG. 4 is a flowchart showing part of a material applying process executed by the device shown in FIG. 2.

With reference to FIGS. 3 to 5, the operation of the device of FIG. 2 will be now described.

After adjusting the discharging device 40 so that the material may be discharged from the nozzle 2 of the device 40 at the predetermined flow rate $\underline{K}$, the operator inputs the predetermined flow rate $\overline{K}$ and a target value D of thickness of the material to be applied to the outer peripheral surface of the truncated cone 1, to the robot control device 10 through the control panel 15, whereby the flow rate $\underline{K}$ and the thickness $\underline{D}$ are stored in the nonvolatile memory 14 under the control of the CPU 11. Then, using the control panel 15, the operator teaches two points P1 and P2, which lie on the extension of the rotation axis of the truncated cone 1, a point P3, which is spaced from the outer peripheral edge of the first end face of the truncated cone 1 by a predetermined clearance in the radially outward direction, and an arbitrary point on the outer peripheral edge of the second end face of the truncated cone 1, e.g., a point P4. The operator further teaches a predetermined relationship formula representing the radius $\underline{R}$ of the truncated cone 1 as a function of the position x in the direction of the rotation axis, i.e., R=f(x) of equation (1). At this time, the variables $\underline{A}$ and $\underline{B}$ in equation (1) are set to values larger than the actual radii of the respective two end faces of the truncated cone 1 by the predetermined clearance, so that the nozzle 2 can be positioned at a position spaced from the outer peripheral surface of the truncated cone 1 by the predetermined clearance.

When the operator inputs an initialization command through the control panel 15, the CPU 11 starts the initialization process shown in FIG. 3.

First, the CPU 11 converts various robot axis data (rotation angles of the servomotors for the individual axes) corresponding to the taught points P1 to P4 into coordinate values of these points P1 to P4 expressed in the robot-base coordinate system OB-XBYBZB (Step S1). Next, coordinates representing the origin P5 of the work coordinate system in the robot-base coordinate system are derived, in order to obtain the work coordinate system P5-XwYwZw (Step S2). More specifically, a unit vector 1 in the Xw-axis direction of the work coordinate system which coincides with the rotation axis of the truncated cone 1 is calculated in accordance with equation (10).

$$1 = (lx, ly, lz) = \frac{P1P2}{|P1P2|} \qquad (10)$$

Next, the CPU 11 derives the inner product of the unit vector 1 and a vector P1P3 extending from the taught point P1 to P3, which inner product represents the length $|P1P5|$ from the taught point P1 to the origin P5 of the work coordinate system (equation (11)), and multiplies the length by the unit vector 1 to derive a vector P1P5 (equation (12)).

$$|P1P5| = P1P3 \cdot 1 \qquad (11)$$

$$P1P5 = |P1P5| \cdot 1 \qquad (12)$$

Then, vectors OBP1 and P1P5 are added together, to obtain a vector OBP5, to thereby obtain the coordinate values P5(Xp5, Yp5, Zp5) representing the origin P5 of the work coordinate system in the base coordinate system.

In Step S3 following Step S2, the CPU 11 obtains a transformation matrix M for coordinate transformation between the work coordinate system and the robot-base coordinate system, and then derives an inverse transformation matrix $M^{-1}$ by inversely transforming the transformation matrix M. More specifically, respective unit vectors n and m in the Zw-axis and Yw-axis directions in the work coordinate system are derived in accordance with equations (13) and (14), and then the transformation matrix M expressed by equation (15) is derived based on the respective unit vectors 1, n, and m in the Xw-axis, Yw-axis, and Zw-axis directions, and the coordinate values P5 (Xp5, Yp5, Zp5).

$$n(nx, ny, nz) = \frac{P1P2 \times P1P3}{|P1P2 \times P1P3|} \qquad (13)$$

where the mark × indicates the outer product.

$$m = (mx, my, mz) = n \times 1 \qquad (14)$$

$$M = \begin{bmatrix} lx & mx & nx & Xp5 \\ ly & my & ny & Yp5 \\ lz & mz & nz & Zp5 \\ 0 & 0 & 0 & 1 \end{bmatrix} \qquad (15)$$

The relationship formula between the coordinate values (xw, yw, zw) of the work coordinate system and the coordinate values (xB, yB, zB) of the robot-base coordinate system can be expressed by the following equation (16) using the transformation matrix M.

$$\begin{bmatrix} xB \\ yB \\ zB \\ lB \end{bmatrix} = \begin{bmatrix} lx & mx & nx & Xp5 \\ ly & my & ny & Yp5 \\ lz & mz & nz & Zp5 \\ 0 & 0 & 0 & 1 \end{bmatrix} \begin{bmatrix} xw \\ yw \\ zw \\ 1 \end{bmatrix} \qquad (16)$$

Next, the CPU 11 multiplies the inverse transformation matrix $M^{-1}$ by the coordinate values of the taught point P4 in the robot-base coordinate system, obtained in Step S1, to derive the coordinate values of the taught point P4 on the Xw, Yw and Zw axes of the work coordinate system, and stores the Xw-axis coordinate value representative of the truncated cone length $\underline{L}$ (total distance over which the nozzle 2 travels in the Xw-axis direction) in the register R1 (Step S4). Then, this coordinate value of the Xw axis is substituted for the variable $\underline{x}$ in equation (7), to derive a time period $\underline{t}$ required for the nozzle 2 to move over the truncated cone length $\underline{L}$. Further, the CPU 11 derives the number $\underline{N}$ of division points, by dividing the time period t by the period (e.g., 48 ms) of execution cycle of the later-mentioned material applying process, and raising to a unit the fractions of the resultant value (Step S5). Then, after storing the robot axis data corresponding to the taught point P3 in a register R2 for the material applying process, the CPU resets the count $\underline{n}$ of the division point counter to "0" (Step S6), and ends the initialization process.

After completion of the initialization process, the operator causes the drive unit 50 to operate, thereby rotating the truncated cone 1 about its rotation axis. When a steady state is attained in which the truncated cone 1 is rotated at a sufficiently high predetermined speed, the operator inputs a motion command to the robot control device 10, whereby the CPU 11 of the robot control device starts to execute the teaching program. First, the CPU 11 drives the robot body 30 so as to position the nozzle 2 at the taught point P3, and after this positioning is completed, causes the operation of the material discharging device 40 to start, and starts the material applying process shown in FIGS. 4 and 5. This process is periodically executed at intervals of a predetermined period, e.g., 48 ms, as described above.

In each processing period, the CPU 11 increments the count $\underline{n}$ of the division counter by "1" (Step S10), and determines whether or not the updated count n is smaller than the number $\underline{N}$ of division points (Step S11). If the result of the determination is affirmative, Step S12 is entered. In Step S12, the CPU 11 multiplies the count $\underline{n}$ by the predetermined period of 48 ms, to derive the time period $\underline{t}$ elapsed from the start of the material applying process to the end of the present processing cycle, substitutes the thus derived value t into equation (9) to derive the position $\underline{x}$ on the Xw axis of the work coordinate system, and substitutes the value $\underline{x}$ into equation (1) to derive the radius $\underline{R}$ of the truncated cone 1 at its XW axis position $\underline{x}$. As a result, coordinate values (x, R, O) in the work coordinate system are derived, which values indicate a target position of the nozzle 2 in the present processing cycle (Step S12). Then, the coordinate value x to be used in the later-mentioned calculation in Step S20 is stored in the register R3 (Step S13).

Subsequently, the CPU 11 multiplies the coordinate values (x, R, O) by the transformation matrix M, to derive coordinate values of the target position of the nozzle in the robot-base coordinate system (Step S14), and converts the obtained values to robot axis data (Step S15). Then, these robot axis data representing the taught point P3 and stored in the register R2 in Step S6 of the initialization process, or the robot axis data of the preceding cycle stored in the register R2 in Step S17 in the preceding processing cycle are read from the register R2, and are subtracted from the respective robot axis data of the present cycle, to thereby derive the moving amounts, respectively associated with the individual robot axes, in the present cycle of the material applying process (Step S16). Then, to permit the calculation of the moving amounts for the individual axes in the next cycle, the CPU 11 stores the robot axis data of the present cycle in the register R2 (Step S17).

Then, after setting the number of pulse distribution cycles included in one cycle of the material applying process, e.g., "3," in the distribution counter (Step S18), the CPU 11 divides the robot axis data of the present cycle by the number of the pulse distribution periods, "3," to derive the moving amounts for the respective axes in each of those pulse distribution cycles which are included in the present cycle of the material applying process, and supplies pulses, corresponding in number to the derived amounts, to the servo circuit 18 in each pulse distribution cycle of 16 ms.

The series of Steps S10 to S18 are repeatedly executed at intervals of the processing cycle of 48 ms. As a result, the nozzle 2 is moved along the outer peripheral surface of the truncated cone 1 in the direction of its rotation axis and in its radial direction (in the Xw-axis and Yw-axis directions in the work coordinate system).

Thereafter, if it is determined in Step S11 of a certain processing cycle that the count $n$ of the division point counter has reached the number $N$ of division points, that is, if it is determined that the present processing cycle is the last one, the CPU 11 multiplies the predetermined period 48 ms by the number $N$, to derive the time period $t$ elapsed from the start of the material applying process to the end thereof, and substitutes this value into equation (9), to derive the coordinate value $x$ on the Xw axis of the work coordinate system (Step S19). This value $x$ is equal to or larger than the value representing the Xw-axis position of the center P6 of the second end face of the truncated cone 1 in the work coordinate system.

Next, the CPU 11 derives the current Xw-axis distance between the nozzle 2 and the second end face of the truncated cone 1, by subtracting the Xw-axis coordinate value, representative of the target Xw-axis moving position (the current nozzle position) of the nozzle 2 in the preceding processing cycle and stored in the register R3 in Step S13 of the preceding processing cycle, from the Xw-axis coordinate value of the taught point P6 in the work coordinate system which value is stored in the register R1 in Step S4 of the initialization process. Then, the thus derived distance is divided by a value which is obtained by subtracting the Xw-axis coordinate value, representing the current nozzle position and stored in the register R3, from the Xw-axis coordinate value obtained in Step S19. Further, the fractions of a value obtained by multiplying the result of the above calculation by "3" are raised to a unit, to thereby derive the number of times by which the pulse distribution is to be performed in the current (last) processing cycle. The thus derived number of times indicates the number ("1," "2" or "3") of pulse distribution cycles which should be included in the last processing cycle so as to permit the nozzle 2, in the last processing cycle, to move at least up to its Xw-axis position corresponding to the rotation-axis position of the second end face of the truncated cone 1, the derived number of times being stored in the distribution counter (Step S20).

Next, on the basis of the Xw-axis coordinate value of the taught point P6 representing the truncated cone length $L$ and stored in the register R1 in Step S4 of the initialization process, and the radius $R$ obtained by substituting this coordinate value for the variable $x$ in equation (1), the CPU 11 derives coordinate values (L, R, O) of a target end point P7 of the nozzle 2 expressed in the work coordinate system, which point is to be assumed at the time of completion of the material applying process. Then, the coordinate values of the point P7 in the robot-base coordinate system are obtained by multiplying the coordinate values (L, R, O) by the transformation matrix M (Step S21). Further, these coordinate values are converted to robot axis data (Step S22). Whereupon, the moving amounts for the respective axes in the last processing cycle are derived by subtracting the robot axis data corresponding to the present nozzle position and stored in the register R2 in Step S17 of the preceding processing cycle, from the above converted robot axis data (Step S23). In each of the pulse distribution cycles included in the last processing cycle, the CPU 11 carries out a pulse distribution in accordance with the distribution data for the individual axes obtained by dividing the derived moving amounts for the respective axes by a value stored in the distribution counter in Step S20. When the distal end of the nozzle 2 has reached the point P7 by the pulse distribution in the last pulse distribution cycle, the CPU 11 stops the operation of the material discharging device 40 in accordance with the teaching program, and completes the material applying process. As a consequence, the material is uniformly applied to the outer peripheral surface of the truncated cone 1 to the thickness $D$. The operator then stops the operation of the drive unit 50, so that the rotation of the truncated cone 1 is stopped.

The present invention is not limited to the above embodiment, and various modifications thereof may be made. For example, in the above embodiment, the object to which a material is applied consists of a truncated cone, but the present invention can be applied to a rotating object of any arbitrary shape whose outer diameter varies along its rotation axis, and can be also applied to a rotating object having a constant outer diameter, i.e., a cylindrical body.

What is claimed is:

1. A method of applying a material to a rotating object by using a robot, comprising the steps of:
    (a) setting a flow rate of the material, a thickness to which the material is to be attached, and a relationship formula expressing an outer diameter of the rotating object as a function of a position in a direction of a rotation axis thereof, in a robot control device:
    (b) rotating the rotating object about its rotation axis at a fixed speed;
    (c) discharging the material from a material discharging device having a nozzle mounted on a distal end of an arm of a robot body, toward the rotating object at the flow rate;
    (d) calculating by the robot control device repeatedly with a time period, to determine a target moving amount of the nozzle in the direction of the rotation axis and a target moving amount of the nozzle in a radial direction of the rotating object, to apply the material to the rotating object to the thickness while the nozzle moves for the time period using position of the nozzle in the direction of the rotation axis, the flow rate, the thickness and the relationship formula; and (e) supplying control outputs periodically from the robot control device to the robot body to move the nozzle in the direction of the rotation axis and in the radial direction by the target moving amounts calculated in step (d) during the time period.

2. A method according to claim 1, wherein said method is applied to a rotating object having an outer diameter varying along the rotation axis thereof.

* * * * *

UNITED STATES PATENT AND TRADEMARK OFFICE
CERTIFICATE OF CORRECTION

PATENT NO. : 5,314,722
DATED : May 24, 1994
INVENTOR(S) : Hirohiko Kobayashi

It is certified that error appears in the above-indentified patent and that said Letters Patent is hereby corrected as shown below:

Col. 4, line 19, delete both occurrences of "to";
   line 40, delete "D" and substitute --$\underline{D}$--.
Col. 5, line 13, delete "P1P" and substitute --$\overrightarrow{P1P}$--;
   line 14, delete "P1P" and substitute --$\overrightarrow{P1P}$--;
   line 17, delete "PIP" and substitute --$\overrightarrow{PIP}$--;
   line 19, delete "PIP" and substitute --$\overrightarrow{PIP}$--;
   line 22, delete "PIP" and substitute --$\overrightarrow{PIP}$--;
   line 26, both occurrences, delete "P1P" and substitute --$\overrightarrow{P1P}$--;
   line 27, both occurrences, delete "P1P" and substitute --$\overrightarrow{P1P}$--;
   line 29, delete "OBP" and substitute --$\overrightarrow{OBP}$--, and delete "P1P" and substitute --$\overrightarrow{P1P}$--;
   line 30, delete "OBP" and substitute --$\overrightarrow{OBP}$--;
   line 51, both occurrences, delete "P1P" and substitute --$\overrightarrow{P1P}$--; and
   line 52, both occurrences, delete "P1P" and substitute --$\overrightarrow{P1P}$--.
Col. 8, line 53, after second "a" insert --desired--.

UNITED STATES PATENT AND TRADEMARK OFFICE
CERTIFICATE OF CORRECTION

PATENT NO. : 5,314,722
DATED : May 24, 1994
INVENTOR(S) : Hirohiko Kobayashi

It is certified that error appears in the above-indentified patent and that said Letters Patent is hereby corrected as shown below:

Col. 9, line 2, after second "the" insert --desired--.

Signed and Sealed this

Twenty-seventh Day of September, 1994

Attest:

BRUCE LEHMAN

*Attesting Officer*         *Commissioner of Patents and Trademarks*